United States Patent

Shi et al.

[11] Patent Number: 5,231,126
[45] Date of Patent: Jul. 27, 1993

[54] BETA-CRYSTALLINE FORM OF ISOTACTIC POLYPROPYLENE AND METHOD FOR FORMING THE SAME

[76] Inventors: Guan-yi Shi; Jing-yun Zhang; Hesheng Jing, all of Shanghai Institute of Organic Chemistry, Academia Sinica, 345 Lingling Lu, Shanghai, China

[21] Appl. No.: 308,968

[22] Filed: Feb. 9, 1989

Related U.S. Application Data

[63] Continuation of Ser. No. 195,484, May 17, 1988, abandoned, which is a continuation of Ser. No. 846,001, Mar. 31, 1986, abandoned.

[30] Foreign Application Priority Data

Apr. 1, 1985 [CN]  China ............................. 85100465

[51] Int. Cl.$^5$ .......................... C08K 5/09; C08K 3/20
[52] U.S. Cl. .................................. 524/296; 524/321; 524/400; 524/583; 264/176.1; 264/210.6; 528/486; 528/489
[58] Field of Search ............... 528/486, 489; 264/176 R, 210.6; 524/296, 321, 400, 583

[56] References Cited

U.S. PATENT DOCUMENTS

| | | | |
|---|---|---|---|
| 3,118,847 | 1/1964 | Greear et al. | 524/400 X |
| 3,207,736 | 9/1965 | Wijga | 524/295 |
| 3,257,366 | 6/1966 | Monroe et al. | 524/584 X |
| 3,431,225 | 3/1969 | Duncan | 524/400 X |
| 3,773,741 | 11/1973 | Berta | 524/584 X |
| 4,185,148 | 1/1980 | Sato et al. | 526/348.1 |
| 4,386,129 | 5/1983 | Jacoby | 526/348 X |
| 4,454,281 | 6/1984 | Heitz et al. | 524/400 X |
| 4,704,421 | 11/1987 | Teskin | 524/583 X |

FOREIGN PATENT DOCUMENTS

| | | | |
|---|---|---|---|
| 39-27637 | 12/1964 | Japan | 524/296 |
| 57-172943 | 10/1982 | Japan | 524/583 |

OTHER PUBLICATIONS

Hackh's Chemical Dictionary, J. Grant (ed.), McGraw-Hill, Inc., N.Y., 17, 73, 186, 523 (1969).
Leugering et al, "Effects of Crystal Structure and Superstructure on Several Properties of Polypropylene", Die Makromolekulare Chemie 109 (1967), pp. 204–216.
Moos et al, "Nucleation and Polymorphy in Isotactic Polypropylene", Die Angewandte Makromolekulare Chemie 94 (1981), pp. 213-225.
W. Ullmann et al, "Studies on the Monoclinic and Hexagonal Modifications of Isotactic Polypropylene", Progr. Colloid & Polymer Sci. 66, pp. 25–33 (1979).
Morrow, "Polymorphism in Isotactic Polypropyelen", J. Maxromol. Sci.-Phys., B3(1), pp. 53–65 (Mar. 1969).
A. Turner Jones et al, "Crystalline Forms of Isotactic Polypropylene", Imperial Chemical Industries Limited, Welwyn Garden City, Herts., England, Oct. 1963.

Primary Examiner—Wilbert J. Briggs, Sr.
Attorney, Agent, or Firm—Hill, Van Santen, Steadman & Simpson

[57] ABSTRACT

This invention relates to obtaining beta crystalline Phase isotactic polypropylene with high purity and thermal stability simply by melt-crystallization in the presence of a two component beta nucleating agent. The two component beta-nucleating agent is formed by mixing 0.0001–1 weight % of dibasic acid with 0.001–1 weight % oxide, hydroxide or acid salt of a Group IIA metal. Such beta phase polypropylene can be used for the production of high impact strength molding extrusion shapes, microporous film and microporous hollow fiber.

5 Claims, No Drawings

BETA-CRYSTALLINE FORM OF ISOTACTIC POLYPROPYLENE AND METHOD FOR FORMING THE SAME

This is a continuation of application Ser. No. 07/195,484, filed May 17, 1989, now abandoned, which is a continuation of application Ser. No. 846,001, filed Mar. 31, 1986, now abandoned.

This invention relates to a beta-crystalline form of isotactic polypropylene having a high purity and thermal stability and a method of making the same. This invention also relates to the articles made of the beta-crystalline form of polypropylene. More particularly, by melt-crystallization in the presence of our newly discovered beta-nucleating agents, the beta-phase polypropylene is formed, which can be used for producing an article with high impact strength and a microporous films. This invention is also related to the newly discovered beta-nucleating agents, specifically, a two component beta-nucleating agent for polypropylene that has various advantages over beta-nucleating agents known in the art.

BACKGROUND

Isotactic polypropylene is capable of crystallizing in several crystal forms. The alpha or monoclinic form is the most stable and prevalent one. The beta or hexagonal form is occasionally found in commercially available polypropylene, usually at low levels.

The relative proportion ("K") of beta form crystalline in the polypropylene specimen can be determined by X-ray diffraction and expressed by the empirical expression:

$$K = \frac{H_\beta}{H_\beta + H_{110} + H_{040} + H_{130}}$$

Wherein $H_{110}$, $H_{040}$ and $H_{130}$ are the heights of the three strong peaks (100), (040) (130) of the alpha-form respectively and $H_\beta$ is the height of the strong beta-peak (300).

The K value is zero in the absence of the beta form and one if only the beta-form is present in the polypropylene.

In typical commercial products produced through injection molding, spinning filament and extruder shaping have spherulitic morphology, in which there is only a very small percentage of beta-crystallinity. Until recently, there has been no reliable way to produce enough beta-form for detailed studies. H. J. Leugering at Hoechst has reported that small amounts of a quinacridone colorant, permanent REd E3B, preferentially nucleated the beta-form. This compound is one of a few effective well known beta-uncleating agent. But even when polypropylene is crystallized from the melt in the presence of E3B, it is still difficult to obtain a material with a relatively high amount of beta-form. Ullmann and Wendorf have reported that the K value of polypropylene samples, crystallized in the presence of E3B, is less than 0.6. Moos and Hilger have succeeded in producing a sample with a K value as high as 0.85 by melt-extrusion of a special powder grade of polypropylene with E3B in a twin-screw extruder, but no further studies have been conducted. A method was disclosed in JP Kokai No. 57-172943 for producing the beta-form of isotactic polypropylene, which comprises mixing a quinacridone colorant with a polymerization catalyst, and then polymerizing the propylene in the presence of the foregoing mentioned mixed catalyst. The thus produced polypropylene was melt-extruded and then crystallized at a cooling rate of 10° C./min. The sample was reported to contain 63-88% of beta-form, as measured by a differential scanning calorimeter (D.S.C.). The D.S.C. method, however, is not a precise method for measuring beta-form content in our opinion, based on our experience the content of beta-form measured by D.S.C. may be overestimated. Furthermore the beta-phase polypropylene thus obtained is red in color, thermally unstable and easily transform into the alpha-form during heating.

Another beta-nucleating agent described in the literature is the bi-sodium salt of O-phthalic acid and to a lesser degree isophthalic and terephthalic acids. These beta-nucleating agents are less effective than the E3B and no quantitative data for the K value is given.

The inventions of the present invention have unexpectedly found a more effective beta-nucleating agent for polypropylene which is able to produce a much higher content of beta-form polypropylene material under typical processing conditions.

SUMMARY OF THE INVENTION

One of the objects of the present invention is to provide a method for producing beta-form crystalline polypropylene. The method comprises mixing an effective beta-nucleating agent provided by this invention with commercially available polypropylene at a certain proportion and then melt-processing the mixture under typical conditions.

Another object of the invention is to provide a beta-crystalline form of isotactic polypropylene, wherein the proportion of beta-form crystalline, as expressed in a K value, lies between 0.85 and 0.93, as measured by X-ray diffraction.

A further object of the invention is to provide articles made of the beta-crystalline phase polypropylene material of this invention. The articles have a much higher impact strength and other properties that presently available commercial polypropylene does not provide.

It is another object of the present invention to also provide a two component beta-nucleating agent.

DETAILED DESCRIPTION OF THE INVENTION

This invention provides a more effective beta-nucleating agent which is colorless, thermo-stable and non-volatile below 320° C. By which in the presence of the foregoing beta-nucleating agent a colorless polypropylene with a much higher beta-form content can be obtained under typical processing conditions. The relative amount of beta-form, as expressed by a K value for samples crystallized at a temperature of between 25°-135° C. lies between 0.85 and 0.93. The mixing of polypropylene with beta-nucleating agent is quite simple and can be performed by a single screw extruder. Commercially available pellet grade polypropylene can be used for this purpose. The beta-phase polypropylene thus obtained has improved thermal stability and does not transform to the alpha-form prior to their melting.

The beta-nucleating agent, provided by this invention is formed by the mixing of components A and B. Component a is an organic dibasic acid, such as pimelic acid, azelaic acid, o-phthalic acid, terephthalic and isophthalic acid and the like. Component B is an oxide, hydroxide or an acid salt of a Group II metal e.g. magnesium, Calcium, Stronium and Barium. The acid salt of Component B may come from inorganic or organic acid such as carbonate, stearate etc. Component B may also be one of the additives of polypropylene, that already is present in the pellet material.

The proportion of component A is in the range of 0.0001–5% by weight, most preferably 0.01–1 wt %, the proportion of component B is 0.0002–5% by weight, most preferably 0.05–1%, during mixing. The beta-form of the polypropylene produced according to this invention has improved mechanical properties as shown in Tables 1 and 2. The mechanical properties of the alpha and beta-form of polypropylene shown in Table 1 were tested at room temperature.

| crystalline form | Youngs modulus $\times 10^{-3}$ Kg/cm | Yield strength Kg/cm2 | Tensile strength Kg/cm2 |
|---|---|---|---|
| alpha | 10.7 | 358 | 451 |
| beta | 8.6 | 276 | 485 |

TABLE 2

Impact strength of alpha and beta form of polypropylene at 23° C.

| Melt flow rate g/10 min | Impact strength Notched kg · cm/cm$^2$ | |
|---|---|---|
| | alpha | beta |
| 0.47 | 13 | 40 |
| 1.7 | 6.8 | 17.6 |
| 2.7 | 3.4 | 10.1 |

Beta-phase polypropylene has a lower yield strength and a higher impact strength in comparison with alpha-phase polypropylene of the same grade. Another feature of the beta-phase polypropylene is that it transforms into the alpha-form, with some voids in it, when the beta-form sample is stretched. Therefore a microporous film can be obtained simply by drawing the beta form of the isotactic polypropylene.

The unique properties of the beta-phase polypropylene lend themselves to a variety of potential applications, including high impact resistant molding articles, microporous films, synthetic paper, rough surface film having good oil impregnation for electrical equipment.

EXAMPLE 1

5 Kg of commercially available pellets of polypropylene homopolymer 1300 (melt flow rate 1.5 gm/10 min), supplied by Xiangyang Chemical works were used as a starting material. The beta-nucleator was prepared by mixing 5 gm of azelaic acid with 5 gm of calcium carbonate. The materials were processed by premixing the polypropylene pellets with the beta-nucleator powder, followed by melt-processing using a single screw extruder at 200° C. The extrudates after quenching in cold water were cut into pellets, then isothermally crystallized from the melt. The formation of the beta form, in addition to the alpha-form, as expressed by the K-value was observed at a crystallization temperature range from 23° to 140° C. The results obtained are summarized in the following table.

TABLE 3

The dependence of the K value on Crystallization temperature for polypropylene homopolymer 1330

| Crystallization temperature, °C. | K Value |
|---|---|
| 23.2 | 0.87 |

TABLE 3-continued

The dependence of the K value on Crystallization temperature for polypropylene homopolymer 1330

| Crystallization temperature. °C. | K Value |
|---|---|
| 40 | 0.90 |
| 60 | 0.90 |
| 80 | 0.91 |
| 100 | 0.92 |
| 120 | 0.93 |
| 130 | 0.91 |

EXAMPLE 2

The experiment of Example 1 was repeated except that the beta-nucleator was prepared by mixing 5 gm of pimelic acid with 5 gm calcium carbonate. The K value of the sample, crystallized at a temperature range of 25°–130° C., was between 0.85 and 0.93.

EXAMPLE 3

The experiment of Example 1 was repeated except that the beta-nucleator was prepared by mixing 5 gm of terephthalic acid with 5 gm calcium oxide. The K value of the sample, crystallized at a temperature range of 25°–130° C., was between 0.85 and 0.93.

EXAMPLE 4

The experiment of Example 1 was repeated except that the polypropylene sample used was a block-copolymer grade 1330 (melt-flow rate 3.0 gm/10 min), supplied by Siangyang Chemical Works. The K value of the sample, crystallized at a temperature range of 23°–120° C., is shown in the following table.

TABLE 4

The dependence of the K value on crystallization temperature for ethylene-propylene block copolymer 1330 (ethyene blocks content 22%)

| Crystallization temperature °C. | K Value |
|---|---|
| 23.2 | 0.86 |
| 40 | 0.88 |
| 60 | 0.89 |
| 80 | 0.88 |
| 100 | 0.92 |
| 120 | 0.92 |

EXAMPLE 5

The experiment of Example 1 was repeated except that component B of the beta nucleator was 5 gm barium oxide. The K value of the sample thus obtained was between 0.85 and 0.93 at crystallization temperatures from 25° to 120° C.

EXAMPLE 6

The sample prepared according to Example 1 was injection molded into notched specimens for impact testing. When they were tested at 23° C., they exhibited an average value of impact strength of 17.6 kg.cm/cm$^2$. Whereas the alpha form of the same grade sample was 6.8 kg.cm/cm$^2$.

EXAMPLE 7

The polypropylene pellet sample, prepared according to Example 1, was first extruded into a thin film by a flat-die extruder, then crystallized during cooling. The film was then stretched uniaxially or biaxially at a temperature range between 60° and 140° C. During the stretching process the film was converted into a microporous film which was opaque and was of greatly reduced apparent density. The film was heat-treated in a tensioned state to stabilize the void structure. The resultant film had a whiteness of 95% and was printable on both sides by oil based inks and also by typewriter ribbon ink.

It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A method for producing a beta-crystalline polypropylene material having a K value of 0.85–0.93, which comprises mixing a two-component beta-nucleating agent consisting of an organic dibasic acid and an oxide, a hydroxide, or an inorganic salt of a Group IIA metal, with polypropylene or an ethylene/propylene block copolymer to form a mixture having 0.0001–5% by weight of the organic dibasic acid and 0.001–5% by weight of the oxide, hydroxide, or inorganic acid salt of the Group IIA metal, melting the mixture, and then allowing crystallization of said polymer from the melt in the presence of the beta-nucleating agent.

2. A method according to claim 1, wherein the organic dibasic acid is selected from the group consisting of pimelic acid, azelaic acid, o-phthalic acid, terephthalic acid and isophthalic acid; and the metal of the Group IIA is selected from the group consisting of magnesium, calcium, strontium and barium, and the said salt is selected from the group consisting of inorganic acid salts.

3. A method according to claim 2, wherein the inorganic acid salt is a carbonate.

4. A method according to claim 1, wherein said melting step is conducted in an extruder.

5. A method for producing a beta-crystalline polypropylene material having a K value of 0.85–0.93, which comprises mixing an organic dibasic acid with polypropylene or an ethylene-propylene block copolymer containing an oxide, a hydroxide, or an inorganic acid salt of a group IIA metal to form a mixture having 0.0001–5% by weight of said organic dibasic acid and 0.001–5% by weight of said oxide, hydroxide or acid salt of a Group IIA metal; melting the mixture; and then allowing crystallization of the said polymer from the melt in the presence of said acid and said Group IIA metal oxide, hydroxide, or acid salt.

* * * * *